May 12, 1953     H. G. ENGLER     2,638,274
HUB ODOMETER
Filed Jan. 26, 1952
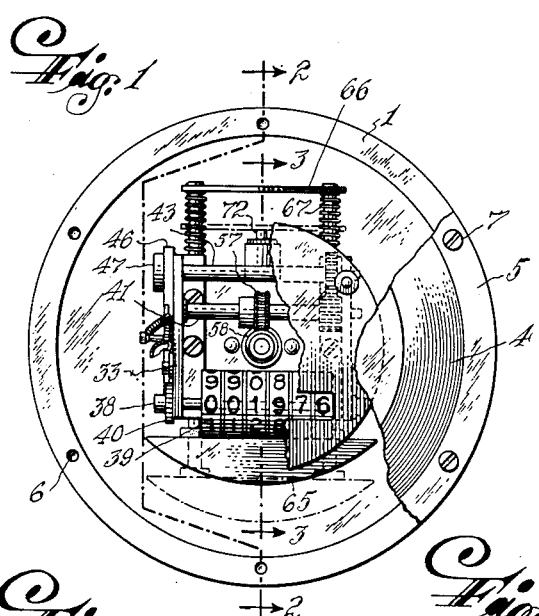
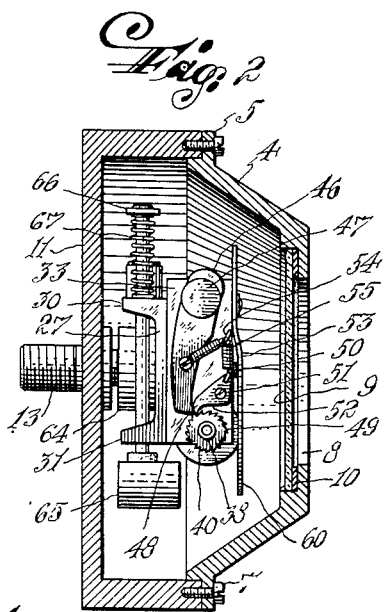
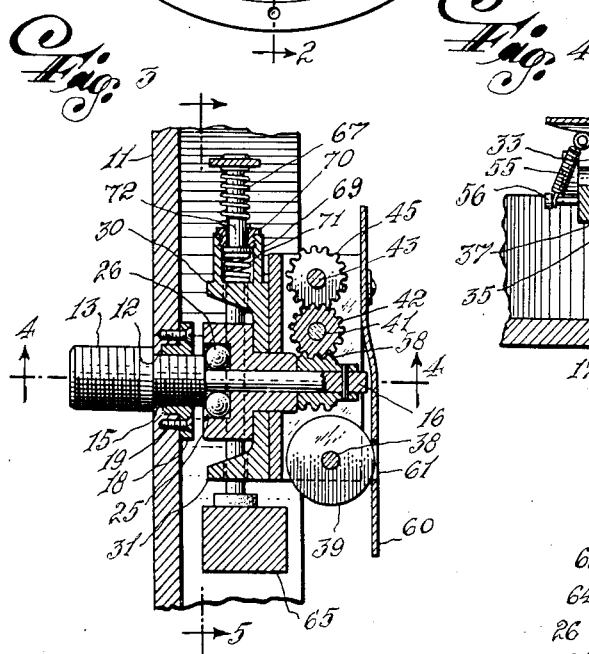
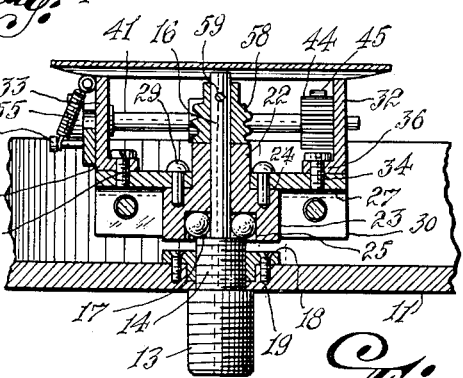
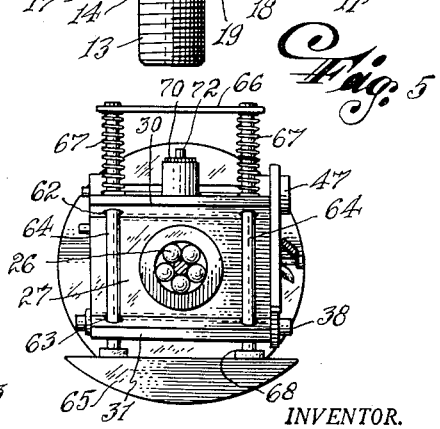
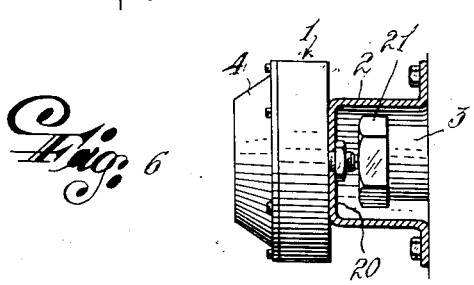
INVENTOR.
Howard G. Engler
BY
Harry B. Cook,
ATTORNEY Patented May 12, 1953

2,638,274

UNITED STATES PATENT OFFICE 2,638,274

HUB ODOMETER

Howard G. Engler, Short Hills, N. J., assignor to Engler Instrument Company, Jersey City, N. J., a corporation of New Jersey Application January 26, 1952, Serial No. 268,366

8 Claims. (Cl. 235—95)

This invention relates generally to mechanisms for registering revolutions of a rotating member which are of the so-called "driveless" type and are self-contained, and the invention more particularly relates to odometers of the type designed to be mounted on the hub cap of a vehicle wheel.

A prime object of the present invention is to provide a register mechanism of the "driveless" type which is effective and accurate under all conditions of operation and which, in particular, is provided with stabilizing means for damping the vibrations and shocks normally occurring when such mechanisms are used.

Another object of the invention is to provide means for supporting the registering mechanism inside the casing in such manner as to permit the mechanism to remain substantially stationary and in an upright position facing the observer while the casing revolves around it.

Another object of the invention is to provide a registering mechanism which is adapted to be used for a variety of commercial purposes and which is provided with the usual rotatable indicating means calibrated in any desired units, such as miles, revolutions, yards, pieces and the like.

Another object is to provide a registering mechanism which is adapted to register both the reverse and forward motions of the rotating member on which the same is mounted.

Another specific object is to provide a registering mechanism with a counterweight for damping the oscillations of the mechanism and for preventing the mechanism from turning clear over in the casing from any motion of the vehicle, and with means for quickly retracting the parts to operative position.

Another object is to provide a registering mechanism that is simple in construction, inexpensive to manufacture, compact, easy to install, dust, moisture and grease-proof and long lasting.

Various other objects and advantages of the invention will be in part obvious from an inspection of the accompanying drawing and in part will be more fully set forth in the following particular description of one form of mechanism embodying the invention, and the invention also consists in certain new and useful features of construction and combination of parts hereinafter set forth and claimed.

In the accompanying drawing,

Figure 1 is a front view of a hub odometer embodying the invention, parts being broken away.

Figure 2 is a vertical sectional view taken on the plane of the line 2—2 of Figure 1 and looking in the direction of the arrows.

Figure 3 is an enlarged vertical sectional view taken on the plane of the line 3—3 of Figure 1 and looking in the direction of the arrows.

Figure 4 is a horizontal sectional view taken on the plane of the line 4—4 of Figure 3 and looking in the direction of the arrows.

Figure 5 is a reduced vertical sectional view taken on the plane of the line 5—5 of Figure 3 and looking in the direction of the arrows.

Figure 6 is a reduced side elevational view of the hub odometer mounted on the hub cap of a vehicle wheel, the hub cap being shown in section.

Referring to the drawing, the register mechanism is mounted in a suitable casing 1 which is adapted to be mounted on a rotating member. In the specific embodiment shown in the drawing, the casing is mounted on the hub cap 2 of a vehicle, which cap houses the outer end of the vehicle shaft 3, for the wheels. The casing is preferably a sheet metal stamping and is illustrated as of a flat cylindrical form as this form is most conveniently shaped to fit the hub caps now in general use, but the shape of the casing will obviously be that form which lends itself most conveniently to the configuration of the mounting part. The containing casing is opened at its front end and is otherwise closed so as to minimize the possibility of dirt, dust, grease and moisture filtering into the interior of the casing. A dome-shaped cover plate 4 fits over the front of the casing and is provided with a laterally extending flange 5 having holes adapted to register with screw holes 6 in the front edge of the casing for receiving fastening members such as bolts 7 whereby the cover plate is fastened to the casing. The cover plate 4 is formed with an opening 8 fitted with a window 9 through which the indicating mechanism in the casing may be readily read and the opening is sealed around the edge of the window by a gasket 10.

The rear wall 11 of the casing is formed with a central opening 12 through which the drive shaft of the register mechanism extends. The shaft is formed with a rear externally projecting end 13 which is enlarged and externally screw threaded, another externally screw threaded portion 14 of smaller diameter inwardly of the enlarged portion forming a shoulder 15 therebetween, and a non-threaded portion 16 inwardly of the threaded portion 14 and of smaller diameter thereby forming a shoulder 17 therebetween.

The inner surface of the rear wall around the opening 12 is countersunk to receive a bushing member 18 which is secured to the wall by fastening members such as screws 19. The intermediate threaded portion 14 of the shaft is threaded into the bushing for rigidly securing the shaft to the casing. The shoulder 15 is adapted to position the shaft in the wall. The rear projecting end of the drive shaft extends through an opening in the front wall 20 of the hub cap 2 and a nut 21 demountably fastens the casing to the hub cap.

A sleeve member 22 is rotatably mounted on the non-threaded portion 16 of the drive shaft inside the casing. The sleeve member at its inner end is formed with an enlarged or head portion 23 forming a shoulder 24 and having a countersunk portion 25 in its inner face which with the shoulder 17 on the drive shaft forms a raceway for ball bearings 26 to permit the casing to move around the register mechanism with slight friction. It will be understood that an oilless bronze bearing or any other suitable bearing may be used in place of the ball bearings.

A platform 27 having a central opening 28 is supported on the shoulder 24 of the sleeve member and is secured thereto by rivets 29. The platform is formed with upper and lower inwardly extending flanges 30 and 31, respectively, as viewed in Figure 2. Bearing plates 32 and 33 extend outwardly from the front face of the platform at its sides and are secured to the platform by screws 34 and 35 extending through flange portions 36 and 37, respectively, resting on the platform. The platform and side bearing plates form a frame for supporting the registering mechanism.

The side plates 32 and 33 are drilled in the direction of their thickness to provide bearings for the shafts hereinafter described and coact with these shafts to provide a rugged, well-braced frame for carrying the odometer parts. One of the shafts 38 extends between and through each of the side plates. A numeral wheel set made up of a series of connected number wheels 39 is loosely mounted upon the shaft 38 and includes in its organization a one-way counterdrive ratchet wheel 40 at one end abutting against the outer face of the side plate 33.

Another shaft 41, hereinafter identified as the secondary drive shaft, has its opposite ends journalled in another set of bearing holes in the side plates 32 and 33 and is disposed parallel to shaft 38. The shaft 41 is provided with a worm gear 42 of relatively large diameter so as to attain the necessary gear reduction, and is centered on the shaft so as to bring the same in line with a diameter passing through the axis of the casing.

Another shaft 43 extends between and through each of the side plates and is disposed parallel and adjacent to and above the shaft 41. A wide faced gear 44 mounted adjacent one end of shaft 41 abutting against the inner face of side plate 32 meshes with a gear 45 of larger diameter on the adjacent end of shaft 43 whereby movement of the shaft 41 is imparted to shaft 43 at a reduced speed.

An elongated feeding pawl 46 is loosely mounted at one end on the protruding end of shaft 43 and fastened on the outer end of said shaft is a camming disk 47 having a camming ring portion on its inner surface rotatably mounted in an opening in the mounted end of the pawl whereby the pawl is oscillated at intervals as shaft 43 rotates. The other end of the pawl extends to a point adjacent the ratchet wheel 40 on the outer end of shaft 38, and is bent to one side of the line of thrust of the pawl and constitutes a lifting finger 48 designed to engage succeeding teeth 49 of the ratchet wheel 40 and feed the ratchet wheel in a clockwise direction as viewed in Figure 2 with a step by step motion. It will be apparent that this clockwise movement of the ratchet wheel is independent of the direction of rotation of the secondary drive shaft 41. Accordingly the device will measure positively both reverse and forward relative movements of the shaft 41.

It is understood that the ratchet wheel actuates the numeral wheels 39 on the shaft 38 in succession. The lower order wheel is actuated directly by the ratchet wheel and suitable transfer mechanism is provided between the lower and higher order numeral wheels, such as the well known Geneva gearing, whereby the higher order numeral wheels register a predetermined number of rotations of the lower order numeral wheels.

A locking pawl 50 is pivotally mounted on a pin 51 projecting from the side plate 33 and is positioned above the axis of rotation of the ratchet wheel 40. The pawl 50 is provided with a finger 52 for engaging the teeth of the ratchet wheel to prevent reverse movement thereof during the dwell of the feeding pawl. A short coiled tension spring 53 has one end secured to a projection on the locking pawl 50 and has its opposite end secured to a hooked pin 54 projecting from the side plate 33. Another short coiled tension spring 55 has one end secured to a pin 56 projecting from the feeding pawl 46 and its other end secured to the hooked pin. By reason of this spring construction, the engaging ends of the feeding and locking pawls are maintained in resilient engagement with the peripherial teeth of the ratchet wheel 40.

The secondary drive shaft 41 is provided with a worm gear 57 of relatively large diameter so as to attain the necessary gear reduction and is centered on the shaft 41 so as to bring the same in line with a diameter passing through the axis of the casing. A worm 58 is fastened to the main drive shaft portion 16 adjacent its inner end by a pin 59 and is designed to engage with the worm gear 57. It is appreciated that the tooth relation between this worm and worm gear establishes the reduction ratio between the relatively fixed shaft 16 and the permanently mounted secondary shaft 41.

A face plate 60 is secured to the outer free edges of the side bearing plates 32 and 33 and conceals the register mechanism from the front. The plate however is provided with the usual form of sight opening 61 positioned opposite the numeral wheel set so that the numerals on the wheels can be visible from the outside of the casing. The plate 60 is positioned in front of the window 9 of the casing and is designed to bear indicia thereby constituting a name plate.

In operation, due to the rigid connection between the main drive shaft and casing, said shaft and casing rotate with the rotating hub cap while the registering mechanism inside the casing remains substantially stationary. As the drive shaft is rotated movement is imparted to the secondary drive shaft 41 by the worm and gear connection and movement is simultaneously imparted to the driven shaft 43 by the meshing gears 44 and 45. As the shaft 43 is rotated the camming disk 47 rotates with it and at predetermined intervals the disk imparts an oscillating movement to the feeding pawl 46 for rotating the ratchet wheel 40 which in turn actuates the numeral wheels 39.

In combination with the register mechanism the present invention contemplates the use of stabilizing means which cooperates with said register mechanism to effectively dampen the oscillations of the mechanism and maintain the mechanism stationary and in an even plane and thus prevent errors in registrations.

In the upper and lower flanges 30 and 31 of the platform 27 adjacent their ends are holes 62 and 63, respectively, and extending between and through these holes are slidable rods 64. An arc-shaped counterweight 65 is supported on the bottom ends of the rods below the lower flange 31 and supported at the top ends thereof, above the upper flange 30, is a transverse bar 66. A coiled compression spring 67 encircles each rod with one end seated on the upper flange 30 and its other end impinging against the bar 66 whereby the rods are biased to uppermost position so as to position the counterweight adjacent to the lower flange of the platform as viewed in Figure 5. Rubber washers 68 or the like may be mounted on the rods between the counterweight and the lower flange to prevent direct engagement therebetween.

By reason of the counterweight the center of gravity of the combined counterweight and registering mechanism is below the axis of the main drive shaft. It will therefore be seen that the tendency of the parts is to remain stationary in the position shown in full lines in Figure 1 in the drawing and that with the vehicle traveling on a smooth roadway the parts would in fact maintain such position with but little if any oscillation.

Suppose now that the wheel carrying the odometer suddenly strikes an elevation or depression in the roadway, thereby converting part of the forward movement of the wheel into upward or downward movement, as the case may be. In such case, the counterweight tends to continue its movement in the same line as before, and would, but for its sliding mounting, oscillate more or less violently about the axis of the main drive shaft and might even make one or more revolutions thereabout, but as it is resiliently and slidably mounted it will be forced downwardly to the position shown in dotted lines in Figure 1 thereby providing a longer radius of rotation and will oscillate on this longer radius until the impulse dies out. Ordinarily the impulse will be absorbed very quickly, but under exceptional circumstances may persist for a number of oscillations but in no case will there be more than slight if any oscillation about the axis of the casing and the counterweight can never "turn turtle" or flop clear over from any motion of the vehicle.

At the center of the upper flange 30 and extending upwardly from its upper surface as viewed in Figure 1 is an integral socket member or housing 69 internally screw threaded at its upper open end for receiving a threaded nut or washer 70. A coiled compression spring 71 is mounted in the socket member with one end seated on the upper flange. A plunger 72 is seated on the other end of the spring and normally protrudes through and outwardly of the nut directly in the path of downward movement of the transverse bar 66 as shown in Figures 3 and 5. The spring 71 cushions the downward movement of the counterweight and subsequently with the aid of the compression springs 67 retracts the counterweight and associated parts to normal operative position with a snap action.

It will be understood that a suitable air and oil shock absorbing and retracting device may be used in place of the spring 71.

The above described registering mechanism is compact and may be mounted effectively in any desired type of casing and in connection with any of the usual type of rotating members, such as automobile wheels, elevator motors, manufacturing apparatus and the like. The instrument may be calibrated to read in terms of revolutions, yards, pieces and the like depending upon the particular use contemplated.

Changes in details of construction might be made without departing from the principle of the invention.

What is claimed is:

1. An odometer comprising a casing having a coaxial drive shaft fixed therein, means for fastening said casing to and for rotation of said shaft coaxially with a rotating element, a registering mechanism arranged as a unit and relatively rotatably mounted on the shaft inside the casing to permit the casing to rotate therearound, and a counterweight resiliently and slidably carried by the unit below the axis of rotation of the casing for movement transversely of said axis, for damping the oscillations of the mechanism, and means for cushioning the movement of said counterweight in one direction.

2. An odometer comprising a casing having a coaxial drive shaft fixed therein, means for fastening said casing to and for rotation of said shaft coaxially with a rotating element, a registering mechanism arranged as a unit and relatively rotatably mounted on the shaft inside the casing to permit the casing to rotate therearound, a counterweight resiliently and slidably carried by the unit below the axis of rotation of the casing for damping the oscillations of the mechanism and means for cushioning the movement of the counterweight in one direction and for retracting the counterweight to normal operative position.

3. An odometer comprising a casing having a coaxial drive shaft fixed therein, means for fastening said casing to and for rotation of said shaft coaxially with a rotating element, a registering mechanism arranged as a unit and loosely mounted on the shaft inside the casing to permit the casing to rotate therearound, a counterweight resiliently and slidably carried by the unit below the axis of rotation of the casing for damping the oscillations of the mechanism and a spring-pressed plunger supported by the mechanism in the path of movement of the counterweight for cushioning the movement of the counterweight and for retracting the counterweight to normal operative position.

4. An odometer comprising a casing having a coaxial drive shaft fixed therein, means for fastening said casing to and for rotation of said shaft coaxially with a rotating element, a registering mechanism arranged as a unit and loosely mounted on the shaft inside the casing to permit the casing to rotate therearound, a supporting frame slidably carried by the registering mechanism for movement transversely of said axis, a counterweight carried by said frame below the axis of rotation of the casing for damping the oscillations of the mechanism, spring means for movably balancing said frame and counterweight, and cushioning means for limiting movement of said frame and counterweight in one direction.

5. An odometer comprising a casing having a coaxial drive shaft fixed therein, means for fastening said casing to and for rotation of said shaft coaxially with a rotating element, a registering mechanism arranged as a unit and loosely mounted on the shaft inside the casing to permit the casing to rotate therearound, said mechanism including a platform rotatably mounted on the shaft, a supporting frame resiliently and slidably carried by said platform, a counterweight carried by said frame below the axis of rotation of the casing for damping the oscillations of the mechanism, a socket device mounted on said platform and a spring-pressed plunger in said socket device disposed in the path of movement of the frame for cushioning the movement of the counterweight and retracting said counterweight to normal operative position.

6. A hub odometer comprising a casing having a central drive shaft fixed thereto and protruding outwardly thereof for fastening to a rotating hub cap for rotation therewith, a registering mechanism arranged as a unit and loosely mounted on the shaft inside the casing to permit the casing to rotate therearound, said mechanism including a platform rotatably mounted on the shaft, a pair of spaced rods slidably supported by said platform, a bar supported across the ends of said rods above the platform, a counterweight supported on the other ends of the rods below the platform and below the axis of rotation of the casing, springs encircling the rods between the platform and bar for resiliently supporting the counterweight in upper position, and cushioning means for limiting downward movement of said frame and counterweight.

7. A hub odometer comprising a casing having a central drive fixed thereto and protruding outwardly thereof for fastening to a rotating hub cap for rotation therewith, a registering mechanism arranged as a unit and loosely mounted on the shaft inside the casing to permit the casing to rotate therearound, said mechanism including a platform rotatably mounted on the shaft, a pair of spaced rods slidably supported by said platform, a bar supported across the ends of said rods above the platform, a counterweight supported on the other ends of the rods below the platform and below the axis of rotation of the casing, springs encircling the rods between the platform and bar for resiliently supporting the counterweight in upper position and a spring-pressed plunger mounted on the platform in the path of movement of the cross bar for cushioning the movement of the counterweight and for retracting said counterweight to normal operative position.

8. In a hub odometer, the combination with a rotating hub cap having an opening in its front wall, of a cylindrical mechanism containing casing having a fixed axially disposed shaft with an externally protruding portion fitted in said opening and rotatable with the hub cap, an odometer mechanism supported on the shaft inside the casing, and removable as a unit from said shaft and including a numeral wheel set, a secondary drive shaft mounted on opposite sides of the axis of the casing, a gear carried by the secondary shaft adjacent said axis, a driving connection between the secondary drive shaft and the numeral wheel set, a worm mounted on the casing shaft inside the casing and adapted to mesh with the gear on the secondary shaft and coact therewith to control the ratio of speeds between the casing shaft and secondary shaft, a slidable counterweight carried by the odometer mechanism below the axis of said casing, said odometer mechanism and weight being balanced to bring the center of gyration in a circle with the axis of rotation as a center to minimize oscillations of the mechanism and weight, said counterweight being adapted to slide to change its position relative to the axis of rotation to change its radius of oscillation for damping the oscillations of the mechanism and counterweight.

HOWARD G. ENGLER.

References Cited in the file of this patent

UNITED STATES PATENTS

| Number | Name | Date |
| --- | --- | --- |
| 1,010,654 | Madden | Dec. 5, 1911 |
| 2,310,296 | Knopt | Feb. 9, 1943 |